3,494,952
MODIFICATION OF CRUDE TOLUENE DIISOCYANATES
Masaji Nakata, Yushin Kataoka, and Koichi Urushibara, Niihama-shi, Japan, assignors to Sumitomo Chemical Company, Ltd., Osaka, Japan, a corporation of Japan
No Drawing. Filed Jan. 13, 1967, Ser. No. 608,958
Claims priority, application Japan, Jan. 19, 1966, 41/3,228
Int. Cl. C07c *119/04;* C08q *11/26;* C08a *22/46*
U.S. Cl. 260—453                              3 Claims

ABSTRACT OF THE DISCLOSURE

Modified toluylenediisocyanates, which are useful for the production of rigid polyurethane foams according to one-shot method, are produced by heating in the presence of specific organo-tin compounds as catalysts toluylenediisocyanates obtained by reacting toluylenediamines with phosgene, the modified toluylenediisocyanates are entirely stable and precipitate no insolubles and have a viscosity of 30–300 cps. at 25° C. and have such a low freezing point as below 0° C.

BACKGROUND OF THE INVENTION

Field of the invention

Polyurethane foams can be obtained by reacting compounds having at least 2 active hydrogen atoms with organic isocyanates in the presence of blowing agents, catalysts, surfactants, and the like. Particularly for the production of a rigid polyurethane foam from a toluylenediisocyanate and a polyether, there has been adopted a so-called prepolymer method in which the toluylenediisocyanate is reacted with a part of the polyether to form a prepolymer, and then the remainder of polyether is added at the stage of foaming to complete the reaction.

As compared with such a prepolymer method, the one-shot method, in which the foaming is completed at one stage, is simple and convenient. However, the production of rigid polyurethane foams according to one-shot method using purified toluylenediisocyanates has not been practically successful up to date.

Description of the prior art

As isocyanates suitable for use in the one-shot method, crude toluylenediisocyanates have been known. The use of the crude toluylenediisocyanates is not only advantageous in view of the production step because the one-shot method is applicable thereto, but also contributes to the improvements in physical properties of the resulting rigid polyurethane foams. In preparing a toluylenediisocyanate by the reaction of toluylenediamine and phosgene, a tarry matter is by-produced. This tarry matter has been uniformly incorporated in the toluylenediisocyanate and is not distilled out, so that it remains as the residue in distillation. Further, it contains little isocyanate group as active ingredient. The amount of the tarry matter by-produced is ordinarily about 5% by weight. It is known that the aforesaid crude toluylenediisocyanate is obtained by merely subjecting such mixture of toluylenediisocyanate and tarry matter to reduced pressure distillation, thereby removing the toluylenediisocyanate to increase the content of the tarry matter. On the other hand, it has been observed that when allowed to stand, toluylenediisocyanates tend to precipitate insolubles and, particularly, crude toluylenediisocyanates, in which the above-mentioned tarry matter is present in a concentrated form, are extremely unstable and ordinarily precipitate several percent of insolubles in a short period of time. It is considered that said insolubles might probably be dimers inherent to isocyanates, and the formation thereof is further promoted by the concentration of said tarry matter. Such insolubles cause fatal drawback in foaming operations, particularly in mechanical foaming, to bring about great disadvantages.

SUMMARY OF THE INVENTION

An object of the present invention is to prepare modified toluylenediisocyanates suitable for the production of rigid polyurethane foams according to one-shot method which are entirely stable and precipitate no insolubles. Other objects will become apparent from the descriptions that follow.

The present invention provides a method for modifying a toluylenediisocyanate in which a mixture of toluylenediisocyanates and tarry matter obtained by the reaction of toluylenediamine and phosgene is treated at an elevated temperature in the presence of a catalyst selected from organo-tin compounds represented by the general formulas

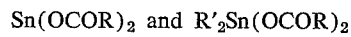

$$\text{Sn(OCOR)}_2 \text{ and } \text{R'}_2\text{Sn(OCOR)}_2$$

wherein R and R' are alkyl groups.

In accordance with the method of the present invention, a part of the toluylenediisocyanate is converted into a non-volatile tarry component, effectively leaving about one half of the isocyanate component. It is therefore possible to obtain in high yields crude toluylenediisocyanates entirely different from the conventional crude toluylenediisocyanates, i.e. modified toluylenediisocyanates. Such modified toluylenediisocyanates do not precipitate insolubles any more. In order to be used as a starting material for polyurethane, such modified toluylenediisocyanates desirably have an amine equivalent of about 105–120 and a toluylenediisocyanate content of about 65–85% by weight. The toluylenediisocyanate content is easily computed by measuring the amount of toluylenediisocyanate distilled from the modified product. Further, the amine equivalent can be suitably varied, depending on purposes, without changing the toluylenediisocyanate content, by controlling the tarry matter conent of the toluylenediisocyanate-tarry matter mixture before the modification treatment. For the preparation of a product having an amine equivalent within said range, a toluylenediisocyanate-tarry matter mixture containing up to 15% by weight of tarry matter may be modified. Toluylenediisocyanate obtained by the phosgenation of toluylenediamine ordinarily contains about 5% by weight of a tarry matter and therefore the control of tarry matter content is effected, in most cases, by removing a part of the toluylenediisocyanate.

The amine equivalent referred to herein is defined as the number of grams of an isocyanate which is consumed by one gram mole of di-n-butylamine in the formation of the corresponding urea and is measured by adding excess 2N-di-n-butylamine to a known amount of the isocyanate mixture and back-titrating the excess butylamine. For example, the amine equivalent of a toluylenediisocyanate with a molecular weight of 174 which has 2 isocyanate groups per molecule is 174/2, i.e., 87.

The toluylenediisocyanate-tarry matter mixture employed as starting material in the method of the present invention is obtained by phosgenation of toluylenediamine and may be one obtained according to any phosgenation process. The phosgenation of toluylenediamine is effected, in most cases in the presence of a solvent such as dichlorobenzene. In such cases, the solvent is desirably removed from the product prior to modification.

The organo-tin compounds employed in the present method which are represented by the general formulas $\text{Sn(OCOR)}_2$ and $\text{R'}_2\text{Sn(OCOR)}_2$, wherein R and R' are alkyl groups, include, for example, stannous octoate, stannous oleate, stannous acetate, dimethyltin diacetate, dibutyltin diacetate, dibutyltin dilaurate, dibutyltin distearate and dilauryltin diacetate. The amount of catalyst to be used is 0.1–2%, preferably 0.5–1.0%, by weight based on the amount of the toluylenediisocyanate-tarry matter mixture. The modification temperature affects the modification rate by means of catalyst and the properties of the resulting product. While a catalyst action is observed even at 150° C., a particularly preferable modification temperature is in the range of 200°–230° C. At elevated temperatures, the catalyst action is accelerated but toluylenediisocyanate itself undergoes vigorous decomposition, and therefore the adoption of a temperature above 250° C. is not desirable. The heating may be effected either at one stage or at two stages, e.g., first at 150°–200° C. and then at 200°–250° C. The catalyst or toluylenediisocyanate-tarry matter mixture to be treated may be divisionally added to the heating zone.

The modified isocyanate obtained according to the method of the present invention have the following advantages:

(1) The products have an adequate amine equivalent and are low in isocyanate group content per unit weight as compared with purified toluylenediisocyanates, and hence bring about no excessive heat generation and temperature increase in the reaction with polyols to make it possible to obtain according to one-shot foaming method rigid polyurethane foam excellent in properties.

(2) The products ordinarily have a viscosity of 30–300 cps. at 25° C. and are entirely homogeneous and stable liquid compositions depositing no insolubles. Further, they are not so excessively low in viscosity as purified toluylenediisocyanate and can be handled with extreme care in mechanical foaming. In addition, they have such a low freezing point as below 0° C. and hence encounters no difficulties in transportation and use in winter time, unlike purified toluylenediisocyanates.

(3) The tarry matter by-product in the phosgenation reaction is not required to be wasted by distillation and separation, but toluylenediisocyanate mixtures containing the tarry matter can be formed into the products at one stage to bring about marked economical advantages.

DESCRIPTION OF THE PREFERRED EMBODIMENTS

The following examples illustrate the invention in which all the parts are by weight.

Example 1

A solution of toluylenediamine (a mixture of about 80% 2,4-toluylenediamine and about 20% 2,6-toluylenediamine) and dichlorobenzene in a weight ratio of 12:130, and a solution of phosgene and dichlorobenzene in a weight ratio of 1:2 were prepared. The amine solution and the phosgene solution were fed at rates of 142 parts and 90 parts per hour, respectively, to a first reactor maintained at 30° C. and were reacted. The reaction product was overflowed in a second reactor maintained at about 70° C. Into the second reactor, phosgene was injected, and was reacted until the reaction liquid become a light fluid. The reaction liquid was further overflowed in a third reactor maintained at 160° C. and the reaction was completed. Into the reaction product, dry nitrogen was injected at 130°–160° C. to exclude unreacted phosgene and hydrogen chloride. Subsequently, the solvent dichlorobenzene was removed by reduced pressure distillation to obtain a mixture of toluenediisocyanate and 5.5% of a by-product tarry matter. The mixture had an amine equivalent of 90.7 and a viscosity at 25° C. of about 10 cps. The viscosity of the mixture was substantially the same as that of the toluylenediisocyanate alone.

To 1300 parts of said mixture, 13 parts of stannous octoate was added as catalyst, and the resulting mixture was heated with stirring at 200° C. in a dry nitrogen atmosphere to effect modification. The modification progressed in substantial proportion to the lapse of time. After heating and modifying for 11 hours, the reaction liquid was cooled to obtain 1288 parts of an entirely homogeneous modified toluylenediisocyanate. When analyzed, the product showed an amine equivalent of 110 and a viscosity at 25° C. of 130 cps. and contained 0.09% by weight of hydrolyzable chlorine. The results of distillation test indicated that the amount of distilled toluylenediisocyanate was 70.5% by weight and the amount of residual tarry matter was 29.5% by weight.

The thus obtained modified toluylenediisocyanate precipitated no insolubles even when allowed to stand for 3 months.

Example 2

To 1300 parts of the same toluylenediisocyanate-tarry matter mixture as in Example 1, 6.5 parts of dibutyltin dilaurate was added. The resulting mixture was heated with stirring at 230° C. for 15 hours in a dry nitrogen atmosphere to effect modification. Thereafter, the reaction, liquid was cooled to obtain 1283 parts of an entirely homogeneous modified toluylenediisocyanate. When analyzed, the product showed an amine equivalent of 105.8 and a viscosity at 25° C. of 35 cps. and contained 0.09% by weight of hydrolyzable chlorine. The results of distillation test indicated that the amount of distilled toluylenediisocyanate was 80% by weight and the amount of residual tarry matter was 20% by weight. The thus obtained modified toluylenediisocyanate precipitated no insolubles even when allowed to stand for 3 months.

Example 3

From 2600 parts of the same toluylenediisocyanate and tarry matter mixture as in Example 1, 1,300 parts of toluylenediisocyanate was removed by distillation to obtain a partially concentrated toluylenediisocyanate liquid having a tarry matter content of about 11% by weight. To 1300 parts of said toluylenediisocyanate liquid, 13 parts of stannous octoate was added as catalyst, and the mixture was heated with stirring at 230° C. for 4 hours in a dry nitrogen atmosphere to effect modification. Thereafter, the reaction liquid was cooled to obtain an entirely homogeneous modified toluylenediisocyanate in 98% yield. When analyzed, the product showed an amine equivalent of 113.5 and a viscosity at 25° C. of 98 cps. and contained 0.18% by weight of hydrolyzable chlorine. The results of distillation test indicated that the amount of distilled toluylenediisocyanate was 69.5% by weight and the amount of residual tarry matter was 30.5% by weight. The thus obtained modified toluylenediisocyanate precipitated no insolubles even when allowed to stand for 3 months.

Example 4

To 1300 parts of the same tolulenediisocyanate-tarry matter mixture as in Example 1, 10.5 parts of stannous acetate was added as catalyst. The resulting mixture was heated with stirring at 210° C. for 8 hours in a dry nitrogen atmosphere to effect modification. Thereafter, the reaction liquid was cooled to obtain 1270 parts of an entirely homogeneous modified toluylenediisocyanate. When analyzed, the product showed an amine equivalent of 107 and a viscosity at 25° C. of 95 cps. and contained 0.09% by weight of hydrolyzable chlorine. The results of distillation test indicated that the amount of distilled toluylenediisocyanate was 72% by weight and the amount of residual tarry matter was 28% by weight. The thus obtained modified toluylenediisocyanate precipitated no insolubles even when allowed to stand for 3 months.

Example 5

To 650 parts of the same toluylenediisocyanate-tarry matter mixture as in Example 1, 13 parts of stannous octoate was added as catalyst. The resulting mixture was heated at 160° C. for 7 hours in a dry nitrogen atmosphere. To this reaction intermediate, 650 parts of the same toluylenediisocyanate-tarry matter mixture as above was further added, and the resulting mixture was heated at 220° C. for 2 hours to obtain 1245 parts of an entirely homogeneous modified toluylenediisocyanate. When analyzed, the product showed an amine equivalent of 114 and a viscosity at 25° C. of 210 cps. and contained 0.09% by weight of hydrolyzable chlorine. The results of distillation test indicated that the amount of distilled toluylenediisocyanate was 68.5% by weight and the amount of residual tarry matter was 31.5% by weight. The thus obtained modified toluylenediisocyanate precipitated no insolubles even when allowed to stand for 3 months.

Comparative example

The same toluylenediisocyanate-tarry matter mixture as in Example 1 was subjected to the so-called conventional simple concentration method carried out by distilling the mixture at 120° C. under a reduced pressure of 10 mm. Hg to remove a definite amount of toluylenediisocyanate. As the result, there was obtained a distillation concentrated crude toluylenediisocyanate containing 30.5% by weight of a tarry matter which corresponded to the concentrated toluylenediisocyanate of Example 3. When analyzed, the product showed an amine equivalent of 118.2 and a viscosity at 25° C. of as high as 500 cps.

What was worse, the product began, immediately after cooling, to precipitate insolubles and, after one week, the whole body of the crude toluylenediisocyanate liquid was substantially brought into a gelled state. This gel-like substance was filtered to obtain precipitated insolubles, which were 6.9% by weight as the content of benzene-insolubles when washed with cold benzene.

Further, the above-mentioned simple concentration operation was discontinued when the content of tarry matter became 20% by weight to obtain a concentrated product corresponding to that of Example 2. This product also precipitated large quantities of insolubles and had a benzene-insoluble content of 4.2% by weight when measured after one week in the same manner as above.

We claim:
1. A method for the modification of toluylenediisocyanates, wherein a material consisting essentially of a toluylenediisocyanate containing up to 15% by weight of tarry matter obtained by the phosgenation of a toluylenediamine, is heated at 150°–250° C. in the presence of a catalyst selected from the group consisting of stannous octoate, stannous oleate, stannous acetate, dimethyltin diacetate, dibutyltin diacetate, dibutyltin dilaurate, dibutyltin distearate and dilauryltin diacetate.

2. A method according to claim 1, wherein the catalyst is employed in an amount of 0.1–2% by weight based on the toluylenediisocyanate containing up to 15% by weight of tarry matter.

3. A method according to claim 1, wherein the catalyst is employed in an amount of 0.5–1.0% by weight based on the toluylenediisocyanate containing up to 15% by weight of tarry matter.

References Cited

UNITED STATES PATENTS

| 2,307,092 | 1/1943 | Yngve | 260—45.75 XR |
| 3,219,678 | 11/1965 | Kober et al. | 260—453 |
| 3,264,336 | 8/1966 | Powers | 260—453 |
| 3,282,975 | 11/1966 | Friedman et al. | 260—453 |
| 3,316,286 | 4/1967 | Kaplan | 260—453 |
| 3,317,481 | 5/1967 | Youker | 260—453 XR |

CHARLES B. PARKER, Primary Examiner

D. H. TORRENCE, Assistant Examiner

U.S. Cl. X.R.

260—2.5, 429.7, 45.75